United States Patent
Mihara

(10) Patent No.: US 10,904,260 B2
(45) Date of Patent: Jan. 26, 2021

(54) INFORMATION PROCESSING SYSTEM, CONTROL METHOD, AND STORAGE MEDIUM THEREFOR

(71) Applicant: CANON KABUSHIKI KAISHA, Tokyo (JP)

(72) Inventor: Makoto Mihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 252 days.

(21) Appl. No.: 16/002,840

(22) Filed: Jun. 7, 2018

(65) Prior Publication Data

US 2018/0367544 A1 Dec. 20, 2018

(30) Foreign Application Priority Data

Jun. 16, 2017 (JP) ................. 2017-118611

(51) Int. Cl.
*H04L 29/00* (2006.01)
*H04L 29/06* (2006.01)
*G06Q 30/00* (2012.01)

(52) U.S. Cl.
CPC ......... *H04L 63/104* (2013.01); *G06Q 30/012* (2013.01); *H04L 63/0807* (2013.01); *H04L 63/20* (2013.01)

(58) Field of Classification Search
CPC ....... G06F 9/45558; G06F 2009/45595; G06F 21/6218; G06F 2009/45587; G06F 21/604
See application file for complete search history.

(56) References Cited

U.S. PATENT DOCUMENTS

2013/0007845 A1* 1/2013 Chang ................. G06F 21/62
726/4
2017/0339156 A1* 11/2017 Gupta .................. H04L 63/101

FOREIGN PATENT DOCUMENTS

JP 4143526 B2 9/2008

* cited by examiner

*Primary Examiner* — Ghazal B Shehni
(74) *Attorney, Agent, or Firm* — Canon U.S.A., Inc. IP Division

(57) ABSTRACT

An information processing system that issues an agreement code upon agreement of a user with a content of a provided agreement screen, and controls provision of data on a device having received the agreement code based on a request access policy associated with the agreement code input to the device.

15 Claims, 12 Drawing Sheets

INFORMATION PROCESSING SYSTEM, CONTROL METHOD, AND STORAGE MEDIUM THEREFOR

BACKGROUND

Field of the Disclosure

The present disclosure generally relates to information processing and, more particularly, to an information processing system, a control method, and a storage medium for managing data on a device.

Description of the Related Art

There is a configuration in which data stored in a device, such as an image forming apparatus, a projector, or a network camera, is transmitted to a cloud system under a circumstance that the device is connected to the cloud system via the Internet. There is another configuration in which data transmitted to a cloud system is utilized by the manufacturer of a device, the owner of a device, or the like.

For example, if a failure has occurred in a device, the manufacturer of the device acquires data on the base, sensors, and the like of the device from the cloud system and provides a service for dealing with the failure. When the device is an image forming apparatus, a seller or dealer provides services for acquiring data on supplies such as copier paper and toner, charging, and providing supplies. When the owner of the device wishes to know the utilization status of the device, there is a service for providing the owner with data obtained by adding up operation logs of the device. A user who provides services using data on a device is hereinafter referred to as a service provider, and a new output provided by the service provider using data on a device is hereinafter referred to as a device service. The type of data acquired by the service provider varies depending on the content of the device service.

Data on the service provider may be managed for each tenant. The term "tenant" refers to a group of aggregated data on a plurality of users, companies, and the like. In this case, data accessible from a service provider belonging to each tenant is set in advance, thereby enabling the service provider to provide the device service as described above based on the set data.

In addition, in view of protecting personal information, it may be necessary to obtain a permission from the owner of a device in the case of accessing data on the device. The permission from the owner of the device enables a tenant or a service provider belonging to the tenant to access the data on the device. Rules for defining data accessible from the service provider is referred to as access policies. Japanese Patent No. 4143526 discloses a computer server that creates access policies for authenticated users.

SUMMARY

The present disclosure provides improvements to information technology in various configurational aspects. According to one or more aspects of the present disclosure, an information processing system includes one or more processors configured to: store data on a device; generate a request access policy associating attribute information about the stored data with tenant information for identifying a tenant accessible to the data; identify a user tenant to which a user who has logged in the information processing system belongs and identify a plurality of tenants involved in a service providing route including the identified user tenant; provide an agreement screen for an agreement that a target tenant accesses data having a specific attribute, based on request access policies related respectively to the plurality of identified tenants issue an agreement code upon agreement of the user with a content of the provided agreement screen and following input of the issued agreement code to the device, control provision of data on the device having received the agreement code based on the access policies respectively associated with the input agreement code.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

As described above, a device is associated with various tenants in a sales route from the production of the device to the operation of the device at a user site (the sales route is hereinafter referred to as a service providing route). Accordingly, in a case where a service provider provides a device service using data on the device, combinations of the tenants belonging to the service provider and data accessed by the tenants are complicated, and there are various kinds of access policies to be defined according to the combinations. This results in complicated setting of the access policies.

The present disclosure provides improvements to information processing technology, among other aspects, to reducing a work for associating a plurality of access policies for a service providing route by collectively agreeing with access policies associated with a plurality of tenants involved in the service providing route, and controlling the provision of data on a device in accordance with the agreed access policies.

According to the present disclosure, it is possible to reduce an effort for associating a plurality of access policies for a service providing route by collectively agreeing with access policies associated with a plurality of tenants involved in the service providing route, and to control the provision of data on a device in accordance with the agreed access policies.

Best modes for carrying out the present disclosure will be described below with reference to exemplary embodiments.

First Exemplary Embodiment

Figure 1:
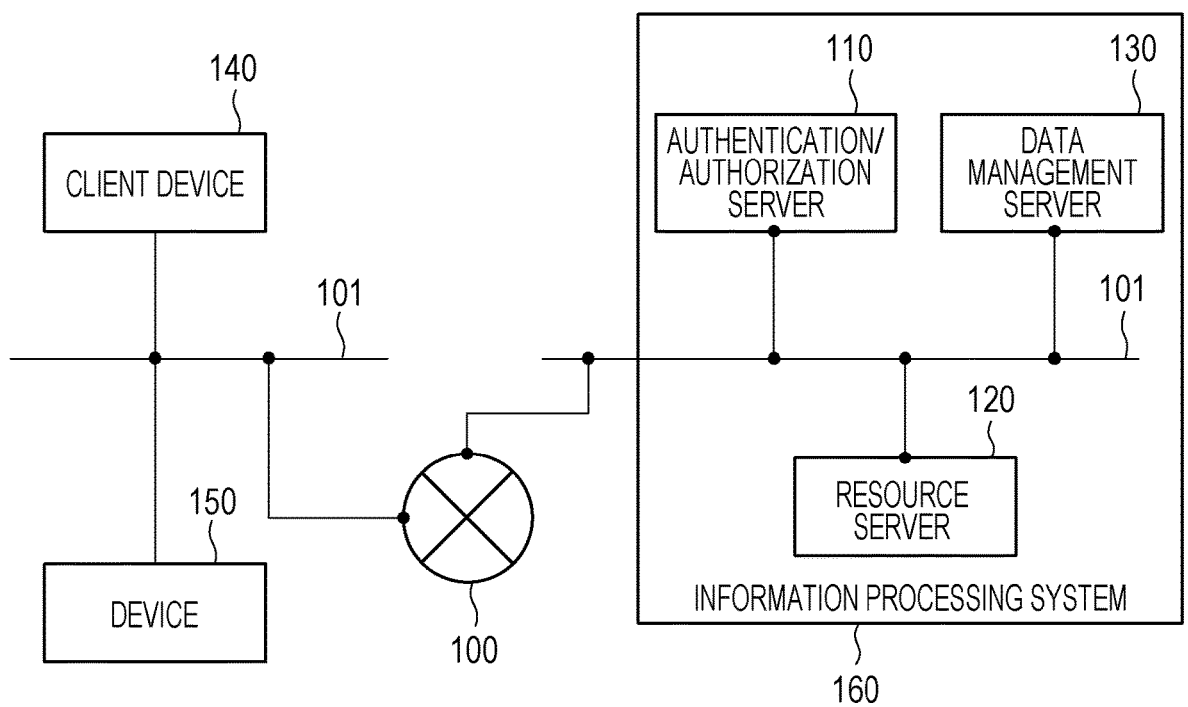
FIG. 1 illustrates a system configuration diagram.

An information processing system 160 according to a first exemplary embodiment and various devices included in a network thereof will be described with reference to FIG. 1. A software application is a function or a function group that is provided by an application executed on a server included in the information processing system 160. Referring to FIG. 1, a client device 140 and a device 150 are connected to a server group, which constructs the information processing system 160, via a wide area network (WAN) 100, thereby constructing a world wide web (WWW). The WAN 100 is connected to each device and each server via a local area network (LAN) 101.

The information processing system 160 includes an authentication/authorization server 110, a resource server 120, and a data management server 130. The authentication/authorization server 110 authenticates the device 150 such as an image forming apparatus or a projector. Although exemplary embodiments described below illustrate an example in which one device 150 is provided, but instead a plurality of devices 150 may be provided. The resource server 120 provides a user with various device services such as a maintenance service for supporting the maintenance of the device 150 by using data on the device 150. The data management server 130 receives data from the device 150, saves data, and sends a response to a data request from the resource server 120.

FIG. 1 illustrates a case where the number of each of the installed servers 100 to 130 is one. However, a plurality of the servers 100 to 130 may be provided, or one server having the functions of the servers 100 to 130 may be provided. The client device 140 has a function for issuing an agreement code for associating the generated request access policy with data. The term "request access policy" refers to rules for defining a tenant or data (or a data type) accessible from the tenant. The request access policy will be described in detail below. Examples of the client device 140 include a personal computer and a mobile terminal. The device 150 has a function for transmitting data necessary for the user to utilize the device service to the information processing system 160, and further transmitting the input agreement code to the information processing system 160.

Figure 2:
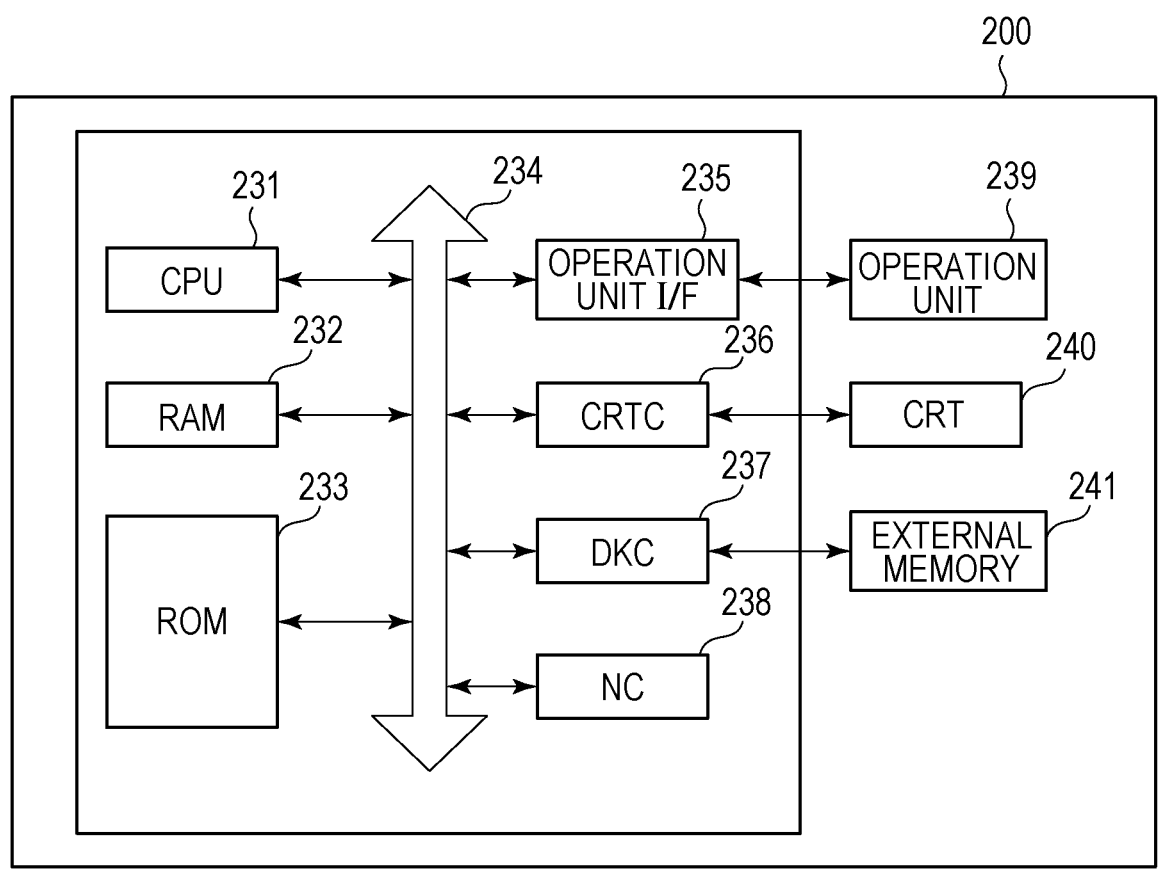
FIG. 2 illustrates an internal configuration diagram of an information processing apparatus 200.

FIG. 2 is a block diagram illustrating an internal configuration of an information processing apparatus 200 of the authentication/authorization server 110, the resource server 120, and the data management server 130, which are included in the information processing system 160 illustrated in FIG. 1. It is assumed herein that, in the block diagram illustrated in FIG. 2, the client device 140 and the device 150 have an internal structure similar to that of the information processing apparatus 200.

A central processing unit (CPU) 231, which may include one or more processors and one or more memories, is a unit that loads a program from a random access memory (RAM) 232, a read only memory (ROM) 233, an external memory 241, or the like, and executes instructions from the program to control the information processing apparatus 200. Sequences described below are processing implemented by executing the instructions from the program. The CPU 231 controls each block connected to the system bus 234.

The RAM 232 is a work memory used for the CPU 231 to execute instructions. The program stored in the ROM 233 is loaded in to the RAM 232, and the CPU 231 sequentially loads instructions from the program and executes the instructions. The ROM 233 is a storage device storing embedded programs including an application program and an operating system (OS), data, and the like.

An operation unit interface (I/F) 235 is a unit that controls an input from an operation unit 239. A cathode ray tube controller (CRTC) 236 is a unit that controls display of a CRT display 240. A disk controller (DKC) 237 is a unit that controls data access to the external memory 241. A network controller (NC) 238 executes communication control processing with a server group or other devices connected via the WAN 100 or the LAN 101. In the following descriptions, unless otherwise noted, the CPU 231 is the subject of a hardware configuration, such as a server or a device, and the application program installed in the external memory 241 is the subject of software.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 3:
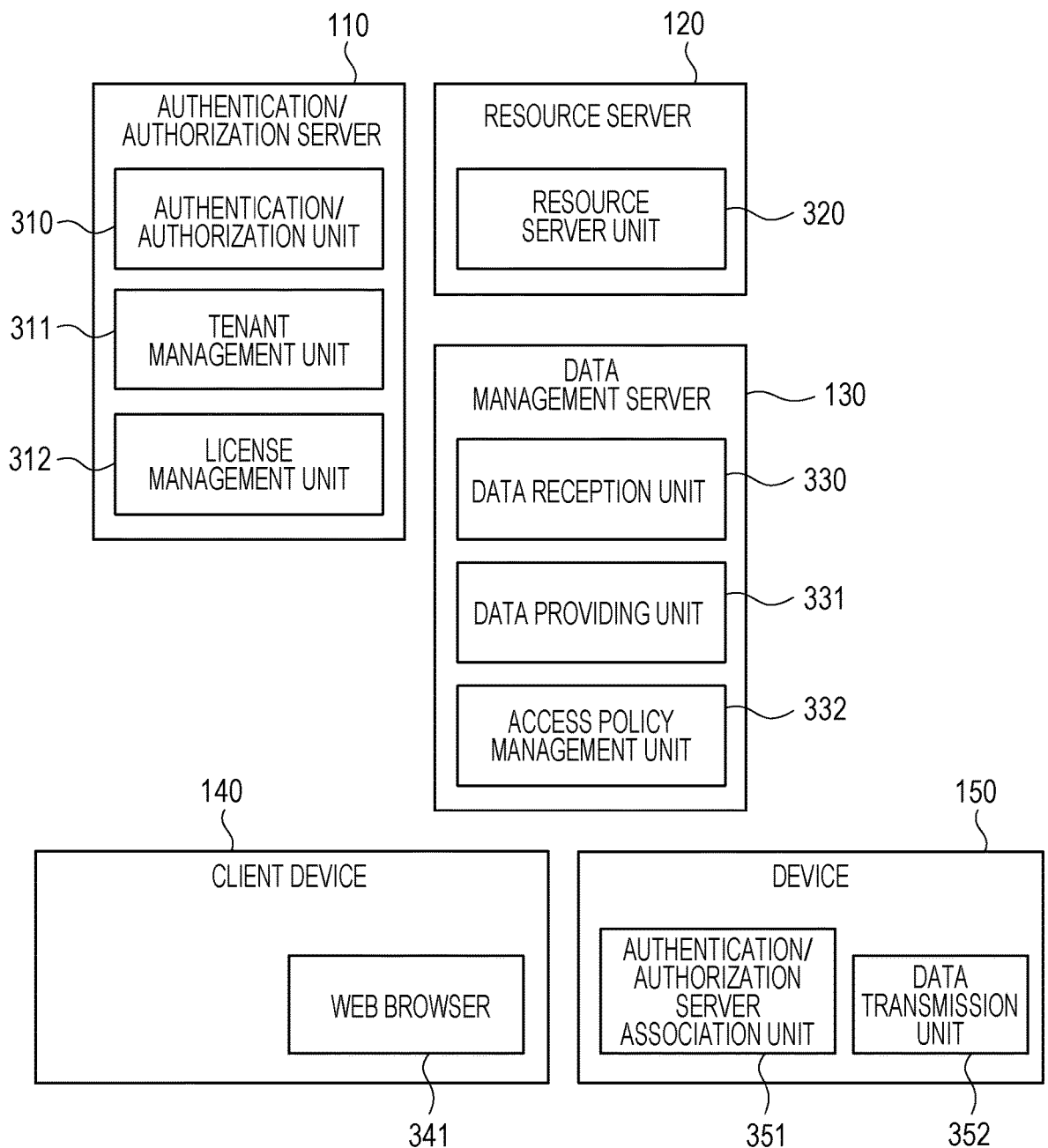
FIG. 3 illustrates functions included in an authentication/authorization server 110, a resource server 120, a data management server 130, a client device 140, and a device 150.

Referring to FIG. 3, the functions of the authentication/authorization server 110, the resource server 120, the data management server 130, the client device 140, and the device 150 will be described. The authentication/authorization server 110 includes an authentication/authorization unit 310, a tenant management unit 311, and a license management unit 312. The authentication/authorization unit 310 has a function for authenticating the service provider to which each tenant belongs, and authorizing the authenticated service provider. The tenant management unit 311 has a function for managing information about each tenant. The license management unit 312 has a function for managing the service providing route. Specifically, the license management unit 312 has a function for managing information (hereinafter referred to as a license) about tenants involved in the service providing route and the client tenant to which a service provider belonging to a sales tenant provides services. Hereinafter, sentences such as "a service provider belonging to a tenant provides services" are expressed as, for example, "a tenant provides services", by using a tenant as a subject.

The resource server 120 includes a resource server unit 320. The resource server unit 320 releases an application programming interface (API) for implementing the software application and executes the released API to thereby provide the software application in response to a request from the client device 140 or the device 150. Further, the resource server unit 320 detects the falsification of a content of a request received by performing verification processing on a signed access token in response to the request from the client device 140 or the device 150, and determines whether to provide the software application.

The data management server 130 includes a data reception unit 330, a data providing unit 331, and an access policy management unit 332. The data reception unit 330 receives data from the device 150 and stores the received data. The data providing unit 331 receives a data provision request from the resource server 120 and provides data according to the content of the received data provision request. The access policy management unit 332 has a function for managing information about tenants permitted to access various data on the device 150.

The client device 140 includes a web browser 341. The web browser 341 has a function to be implemented by a user agent for utilizing a world wide web (WWW). The device 150 includes an authentication/authorization server association unit 351 and a data transmission unit 352. The authentication/authorization server association unit 351 requests the authentication/authorization server 110 to authenticate the device 150, requests the authentication/authorization server 110 to issue an access token, or accesses to the authentication/authorization server 110. The data transmission unit 352 has a function for transmitting the data on the device 150 to the data management server 130.

Figure 4:
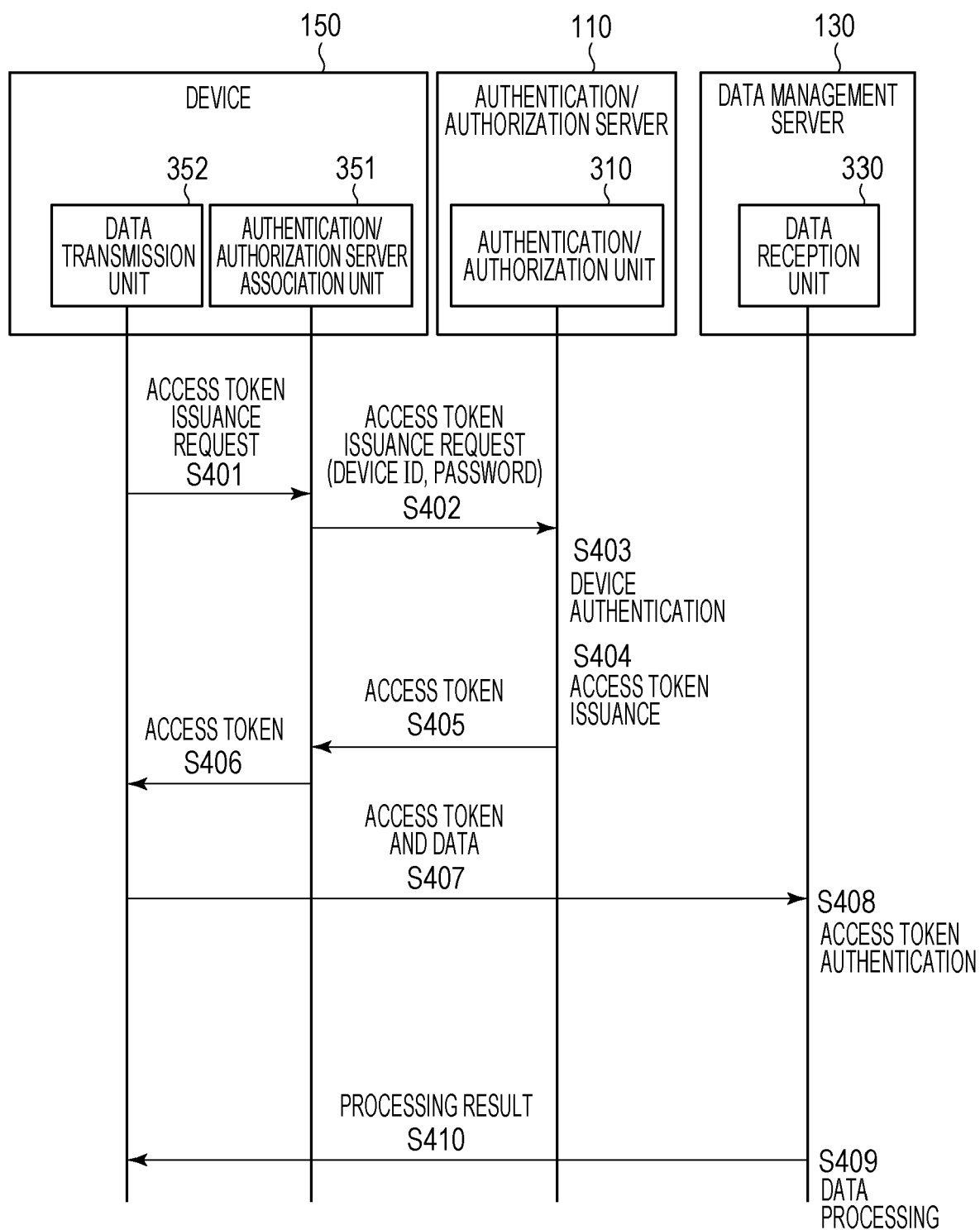
FIG. 4 is a sequence diagram illustrating processing for the device 150 to authenticate the data management server 130 and transmitting data from the device 150 to the data management server 130.

Referring to FIG. 4, processing in which the device 150 is authenticated by the data management server 130 and data is transmitted from the device 150 to the data management server 130 will be described. The processing is started when the processing is periodically executed by the device 150 or executed when an event occurs in the device 150.

The data transmission unit 352 requests the authentication/authorization server association unit 351 to issue an access token (S401). The authentication/authorization server association unit 351 transmits a device ID and a password, which are managed by the authentication/authorization server association unit 351, to the authentication/authorization unit 310, thereby performing an access token issuance request (S402). The device ID is identification information for identifying the device 150. The password is information for authenticating the device 150 to prevent another device from logging on as the device 150 to illegally use the software application of the information processing system 160. Table 1 shows an example of a table storing device IDs and passwords managed by the authentication/authorization unit 310.

TABLE 1

| Device ID | Password |
|---|---|
| dev_000001 | Secret1 |
| dev_000002 | secret2 |

While the present exemplary embodiment illustrates a configuration in which the device ID and the password that are preliminarily registered in the device 150 are transmitted to the authentication/authorization server 110, a method in which the authentication/authorization server 110 generates the device ID may be employed. Specifically, there is a method in which secret information for issuing the device ID is preliminarily registered in the device 150 and the secret information is transmitted to the authentication/authorization server 110, thereby generating the device ID of the device 150.

The authentication/authorization unit 310 compares a pair of the device ID and the password received together with the access token issuance request in step S402 with a pair of a device ID and a password (Table 1) managed by the authentication/authorization unit 310 in advance, thereby authenticating the device 150 (S403). The authentication method is not limited to the comparison of a pair of a device ID and a password, but instead, for example, an authentication method using a device certificate may be employed. In step S403, the device 150 is authenticated, and then the authentication/authorization unit 310 issues an access token (S404) and transmits the issued access token to the authentication/authorization server association unit 351 (S405).

The authentication/authorization server association unit 351 transmits the received access token to the data transmission unit 352 (S406). The data transmission unit 352 transmits the access token and the data on the device 150 to the data reception unit 330 (S407). Examples of the data on the device 150 include a debug log, status information, and a job log. The data reception unit 330 verifies the access token received together with the data in step S407 (S408). It is assumed in the present exemplary embodiment that the JSON Web Token (JWT) specification defined in RFC7519 is used as the access token, and the access token includes information such as a device ID. The access token is not limited to the JWT specification, and random numbers may be used. The data reception unit 330 holds a public key for verifying the received access token. The data reception unit 330 can verify the access token using the public key and acquire the device ID. As the method for verifying the access token, another method in which the data reception unit 330 requests the authentication/authorization unit 310 to verify the access token and acquires the verification result of the device ID from the authentication/authorization unit 310 may be employed.

The data reception unit 330 performs data processing on the data received in step S407 (S409). As a specific example of the processing content, the received data is divided into categories and stored in association with the device ID. Assume in the present exemplary embodiment that the data is divided into three types, i.e., a debug log, status information, and a job log, and each piece of data is associated with the device ID of the device 150 and managed. The data processing is not limited to this example, but instead information for referring to another location where the data on the device 150 is stored, a device ID, and a device category may be associated with each other. In other words, any configuration may be used as long as each piece of data is labelled based on the information for identifying the device 150 and the category of the data. While the present exemplary embodiment illustrates a configuration in which the data on the device 150 is divided for each data category, the data may be divided depending on other conditions, such as the date of issuance, location, or domain of data.

After the data reception unit 330 executes the data processing, the data reception unit 330 returns the processing result to the data transmission unit 352 (S410). The processing in which the device 150 is authenticated by the data management server 130 and data is transmitted from the device 150 to the data management server 130 has been described above.

Figure 5:
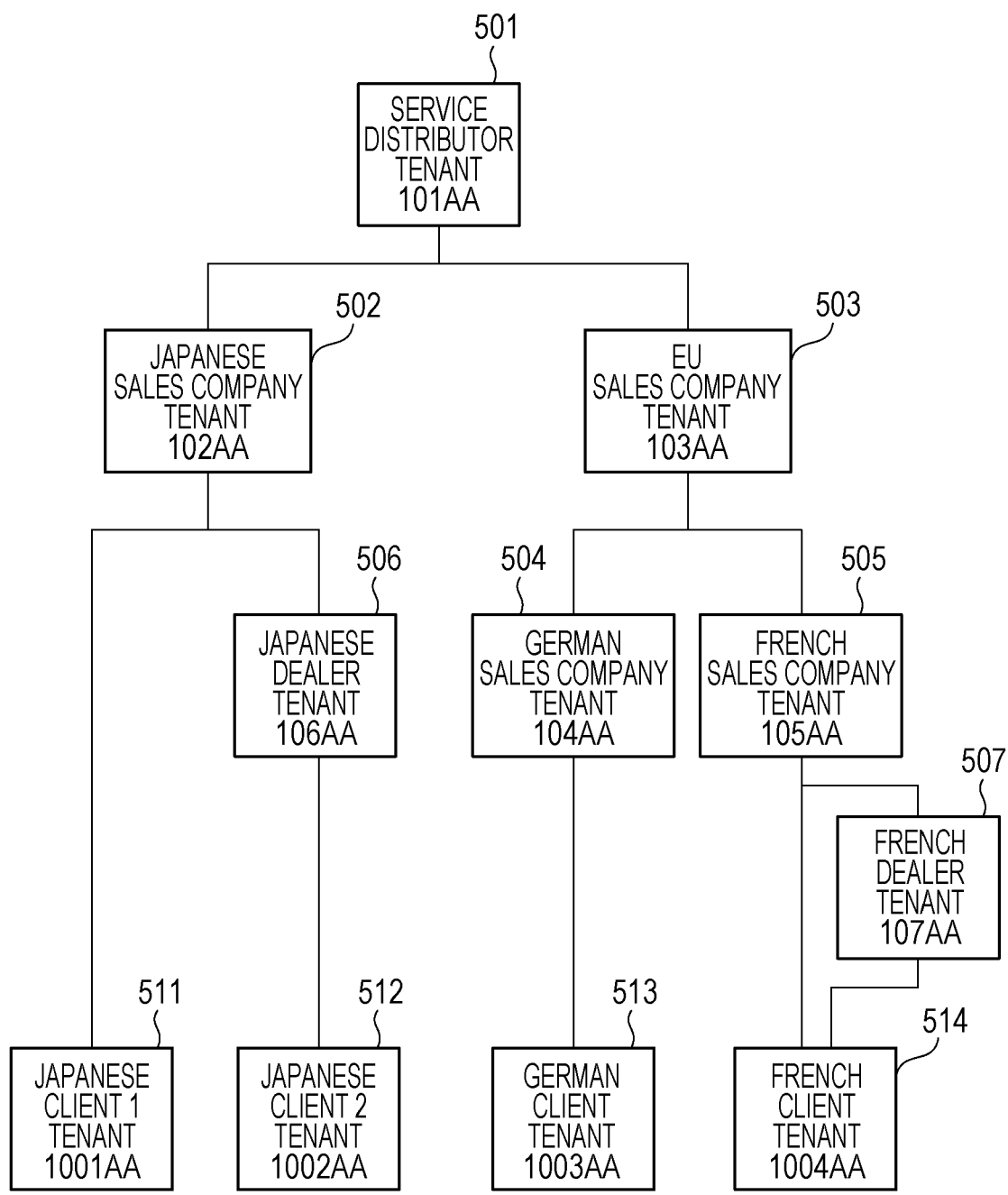
FIG. 5 is a schematic diagram illustrating a configuration of tenants.

Referring next to FIG. 5, information about the tenants managed by the tenant management unit 311 will be described. FIG. 5 schematically illustrates the configuration of tenants. The tenant management unit 311 manages information about a tenant ID for uniquely identifying each of tenants 501 to 514, a tenant name, and a tenant category. Table 2 shows an example of a table managed by the tenant management unit 311.

TABLE 2

| Tenant ID | Tenant Name | Tenant Category |
| --- | --- | --- |
| 101AA | Service Distributor | Sales |
| 102AA | Japanese Sales Company | Sales |
| 103AA | EU Sales Company | Sales |
| 104AA | German Sales Company | Sales |
| 105AA | French Sales Company | Sales |
| 106AA | Japanese Dealer | Sales |
| 107AA | French Dealer | Sales |
| 1001AA | Japanese Client 1 | Client |
| 1002AA | Japanese Client 2 | Client |
| 1003AA | German Client | Client |
| 1004AA | French Client | Client |

The term "tenant category" in Table 2 refers to information for categorizing a tenant (hereinafter referred to as a sales tenant) for providing device services using the data on the device 150 and a tenant (hereinafter referred to as a client tenant) to which device services are provided from the sales tenant. It is assumed herein that the tenants 501 to 507 are sales tenants and the tenants 511 to 514 are client tenants.

Referring next to FIG. 5, information about tenants to which a license is provided from a tenant. Information about the license is managed by the license management unit 312 and an example of the managed information is shown in Table 3. The table shown in Table 3 is preliminarily set in the license management unit 312.

TABLE 3

| License ID | Tenant ID | License Category | Wholesaler tenant ID |
| --- | --- | --- | --- |
| 1 | 101AA | Ma1intenance Service | |
| 2 | 101AA | MDS | |
| 3 | 102AA | Ma1intenance Service | 101AA |
| 4 | 102AA | MDS | 101AA |
| 5 | 103AA | Ma1intenance Service | 101AA |
| 6 | 103AA | MDS | 101AA |
| 7 | 104AA | Ma1intenance Service | 103AA |
| 8 | 104AA | MDS | 103AA |
| 9 | 105AA | Ma1intenance Service | 103AA |
| 10 | 105AA | MDS | 103AA |
| 11 | 106AA | Ma1intenance Service | 102AA |
| 12 | 107AA | MDS | 105AA |
| 13 | 1001AA | Ma1intenance Service | 102AA |
| 14 | 1002AA | Ma1intenance Service | 106AA |
| 15 | 1003AA | Ma1intenance Service | 104AA |
| 16 | 1004AA | Ma1intenance Service | 105AA |
| 17 | 1004AA | MDS | 107AA |

The term "license ID" in Table 3 refers to identification information for uniquely identifying the license. The term "tenant ID" refers to an ID for identifying a tenant that can provide device services identified in the "license category". In this case, "maintenance service" and "MDS" (Managed Document Service) are illustrated as examples of device services identified in the license category. When the device 150 is an image forming apparatus, the maintenance service refers to a device service for maintenance, such as the confirmation of the status of charging or supplies for the image forming apparatus. The MDS refers to a device service for managing who and when printing is performed using the image forming apparatus, reporting the utilization status of the image forming apparatus of the company, and assisting the optimum arrangement or replacement of the image forming apparatus.

The term "wholesaler tenant" refers to a tenant that is permitted by the tenant identified by the "tenant ID" to provide device services identified in the "license category". The term "wholesaler tenant ID" refers to identification information for identifying the wholesaler tenant.

The table of Table 3 is set when the service provider belonging to each wholesaler tenant logs in the information processing system 160 and the service provider provides the tenant with a license. For example, in the case of a license with a license ID "3", the wholesaler tenant ID is "101AA". Accordingly, the service provider belonging to the tenant with the wholesaler tenant ID "101AA" provides the tenant having the tenant ID "102AA" with the license for providing the maintenance service.

Table 3 shows that the tenant to which the license for the maintenance service is provided as the wholesaler tenant from the tenant having the tenant ID "102AA" has the tenant ID "106AA" (license ID "11"). Further, the tenant to which the license for maintenance service is provided as the wholesaler tenant from the tenant having the tenant ID "106AA" has the tenant ID "1002AA" (license ID "14"). Thus, the use of Table 3 makes it possible to sequentially identify the tenants to which the license is provided from the wholesaler tenant.

Next, a master policy and a method for managing the master policy will be described. The term "master policy" refers to information for defining various tenants accessible to the data on the device 150. The master policy is preliminarily set and managed by the access policy management unit 332. Table 4 shows an example of the managed information.

TABLE 4

| Master Policy ID | Access Source Tenant Rule | Data Category |
| --- | --- | --- |
| 1 | Route Tenant | Debug Log |
| 2 | Sales Tree Tenant | Status Information |
| 3 | Service Providing Tenant | Job Log |
| 4 | Service User Tenant | Job Log |

The term "master policy ID" of Table 4 refers to an ID for uniquely identifying the master policy. The term "data category" refers to the type of the data on the device 150. The term "access source tenant rule" refers to the type of the tenant accessible to data designated in the data category. Assume in the present exemplary embodiment that four types of access source tenant rules are defined as shown in Table 4. The term "route tenant" refers to a top tenant that provides the license. Specifically, the route tenant corresponds to the tenant 501. The term "sales tree tenant" refers to a sales tenant included in a tree of sales tenants. Specifically, all tenants except the tenants 511 to 514 correspond to the sales tree tenants. The term "service providing tenant" refers to a sales tenant that provides the license to the client tenant. Specifically, the tenants 502 and 504 to 507 correspond to the service providing tenants. The term "service user tenant" refers to a client tenant to which the license is finally provided. Specifically, the tenants 511 to 514 correspond to the service user tenants. As illustrated in the above examples, some tenants may satisfy a plurality of access source tenant rules. For example, the tenants 502 and 504 to 507 are sales tree tenants as well as service providing tenants.

In Table 4, for example, in the case of a master policy ID "2", it is defined that the sales tree tenant can access status information. For example, in the case of the maintenance service provided to the client tenant "1002AA", the sales tree tenants are "106AA", "102AA", and "101AA", so that the sales tree tenants "106AA", "102AA", and "101AA" can access status information. The master policy and the method for managing the master policy have been described above.

The method for setting access source tenant rules is not limited to the configuration illustrated in Table 4. For example, a configuration in which another attribute value, such as a group, is set when a plurality of tenants included in a group, and the master policy is validated for a specific group having the attribute value may be used. Further, for example, the master policy may be validated when the tenant belongs to a sales tree and has a specific attribute value, or when the tenant is a specific tenant.

Next, a license and a tenant to which the license is provided will be described with reference to Table 5. The access policy management unit 332 is preliminarily set in Table 5, and the license that can be provided by various tenants using the data on the device 150 is defined. In Table 5, for example, the license of the maintenance service is associated with the master policy ID "1" and managed. Accordingly, it is obvious that the tenant belonging to the route tenant can provide the maintenance service.

TABLE 5

| License Category | Master Policy ID List |
|---|---|
| Maintenance Service | 1, 2 |
| MDS | 1, 2, 3, 4 |

Figure 6:
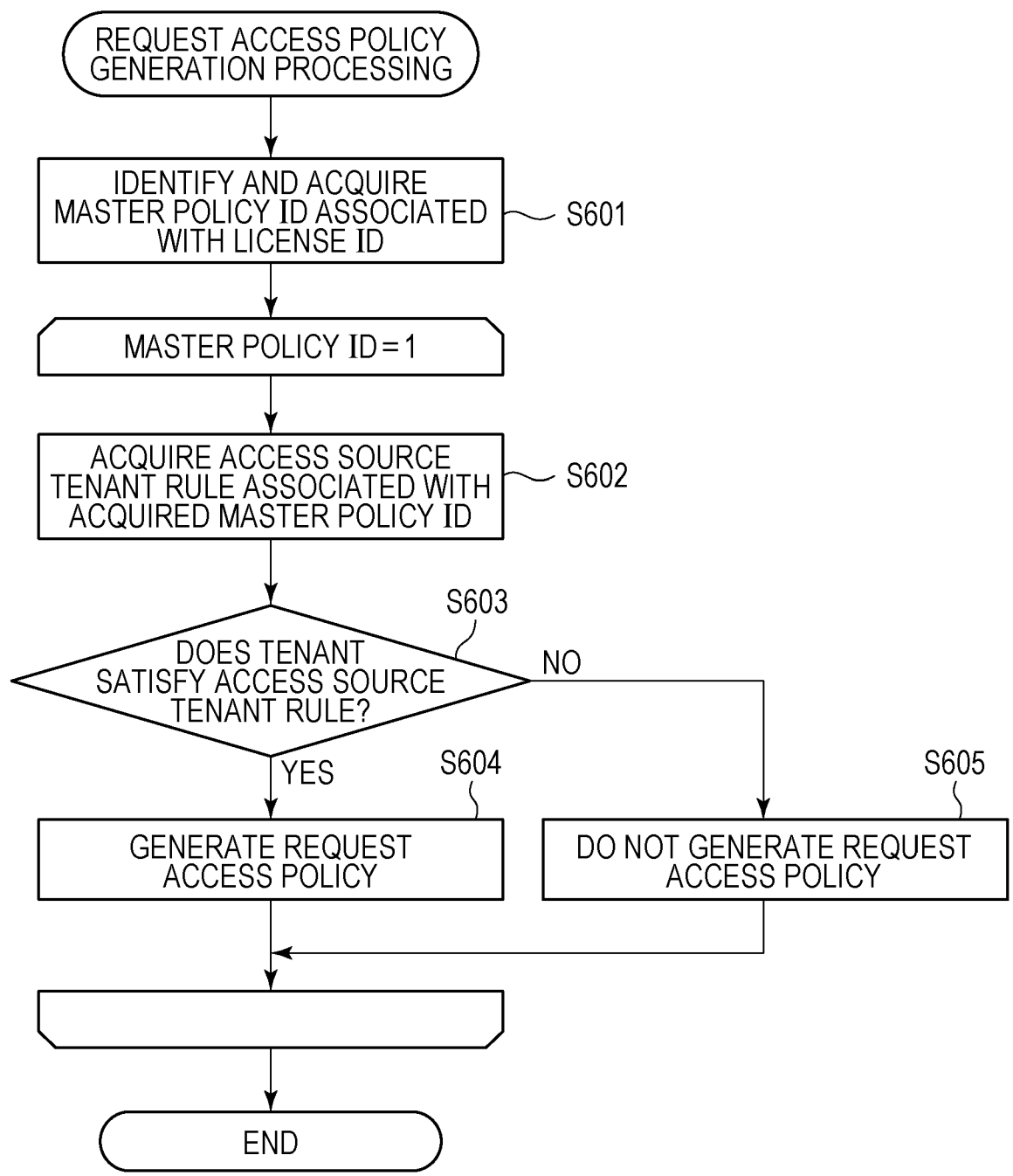
FIG. 6 is a flowchart for creating a request access policy.

Next, a method for generating the request access policy will be described with reference to FIG. 6. FIG. 6 is a flowchart for executing processing in which the access policy management unit 332 generates the request access policy license. The management unit 312 allocates the license to the tenant and starts the processing upon generation of information about the license (Table 3). The request access policy refers to information for defining the data on the device 150 accessible from the tenant. Unlike the master policy for defining the type of a tenant accessible to the data on the device 150, the request access policy uniquely defines the tenant accessible to the data on the device 150.

First, the master policy ID associated with the license ID is identified and the identified master policy ID is acquired (S601). Specifically, when a license ID "1" is allocated, Table 3 shows that the device service that can be provided using the license ID "1" is the maintenance service, and thus the master policy ID "1, 2" associated with the license ID of the maintenance service is acquired from Table 5.

Next, the access policy management unit 332 acquires, from Table 4, the access source tenant rule associated with the master policy ID acquired in step S601 (S602), and checks whether the tenant for which the request access policy is generated at this time satisfies the access source tenant rule (S603). Specifically, assuming herein that the tenant 501 having the license ID "1" is a target tenant, the tenant 501 checks whether the tenant is a route tenant that satisfies the access source tenant rule of the master policy ID "1". The information (Table 3) managed by the license management unit 312 indicates that there is no value corresponding to the wholesaler tenant of the tenant 501, and thus the tenant 501 is a route tenant. Accordingly, the tenant satisfies the access source tenant rule of the master policy ID "1" and the request access policy is generated for the license ID "1". If the license ID is the generation target, the processing proceeds to request access policy generation processing (S604). If the license ID is not the generation target, the request access policy is not generated for the license ID (S605).

Information to be referred to for determination as to whether the target tenant satisfies the access source tenant rule (S603) varies depending on the access source tenant rules shown in Table 4. In the above example, the information managed by the license management unit 312 is referred to for determination as to whether the tenant 501 is a route tenant. In another example, when it is determined whether the tenant 501 is a "sales tree tenant", the information (Table 2) managed by the tenant management unit 311 is referred to for determination as to whether the "tenant category" is "sales". In this manner, the reference destination of information is determined for each access source tenant rule and preliminarily associated with the information in Table 4, thereby making it possible to acquire appropriate information depending on the content of the access source tenant rule.

After the request access policy is generated in step S604, or after the request access policy is not generated in step S605, the processing of steps S602 to S605 is repeatedly performed until all target tenants are checked whether they satisfy the access source tenant rules of the master policy ID. In this case, after the processing for the master policy ID "1", step S602 is executed again as processing for checking whether the access source tenant rule of the master policy ID "2" is satisfied.

Table 6 shows an example of the request access policy generated in step S604. The generated request access policy is managed by the access policy management unit 332. The term "request access policy ID" in Table 6 refers to an ID for uniquely identifying the request access policy. In the case of the license ID "1", which is described by way of example above with reference to FIG. 6, the request access policy IDs of the generated request access policy are "1" and "2".

TABLE 6

| Request Access Policy ID | License ID | Access Source Tenant ID | Data Category |
|---|---|---|---|
| 1 | 1 | 101AA | Debug Log |
| 2 | 1 | 101AA | Status Information |
| 3 | 2 | 101AA | Debug Log |
| 4 | 2 | 101AA | Status Information |
| 5 | 3 | 102AA | Status Information |
| 6 | 4 | 102AA | Status Information |
| 7 | 5 | 103AA | Status Information |
| 8 | 6 | 103AA | Status Information |
| 9 | 7 | 104AA | Status Information |
| 10 | 8 | 104AA | Status Information |
| 11 | 9 | 105AA | Status Information |
| 12 | 10 | 105AA | Status Information |
| 13 | 11 | 106AA | Status Information |
| 14 | 12 | 107AA | Status Information |
| 15 | 17 | 107AA | Job Log |
| 16 | 17 | 1004AA | Job Log |

Next, processing in which the generated request access policy is agreed and the tenant accesses the data on the device 150 according to the agreed request access policy will be described. The request access policy need to be agreed by the owner or the like of the device 150. When the request access policy is agreed, the agreement code is generated and issued in the client device 140. The user inputs the issued agreement code to the device 150, thereby enabling the user to access the data on the device 150 based on the request access policy. The term "user" used herein refers to a service provider belonging to a tenant accessible to the data on the device 150, the owner of the device 150, or the like. The person who inputs the agreement code to the device 150 is not particularly limited.

Figure 7:
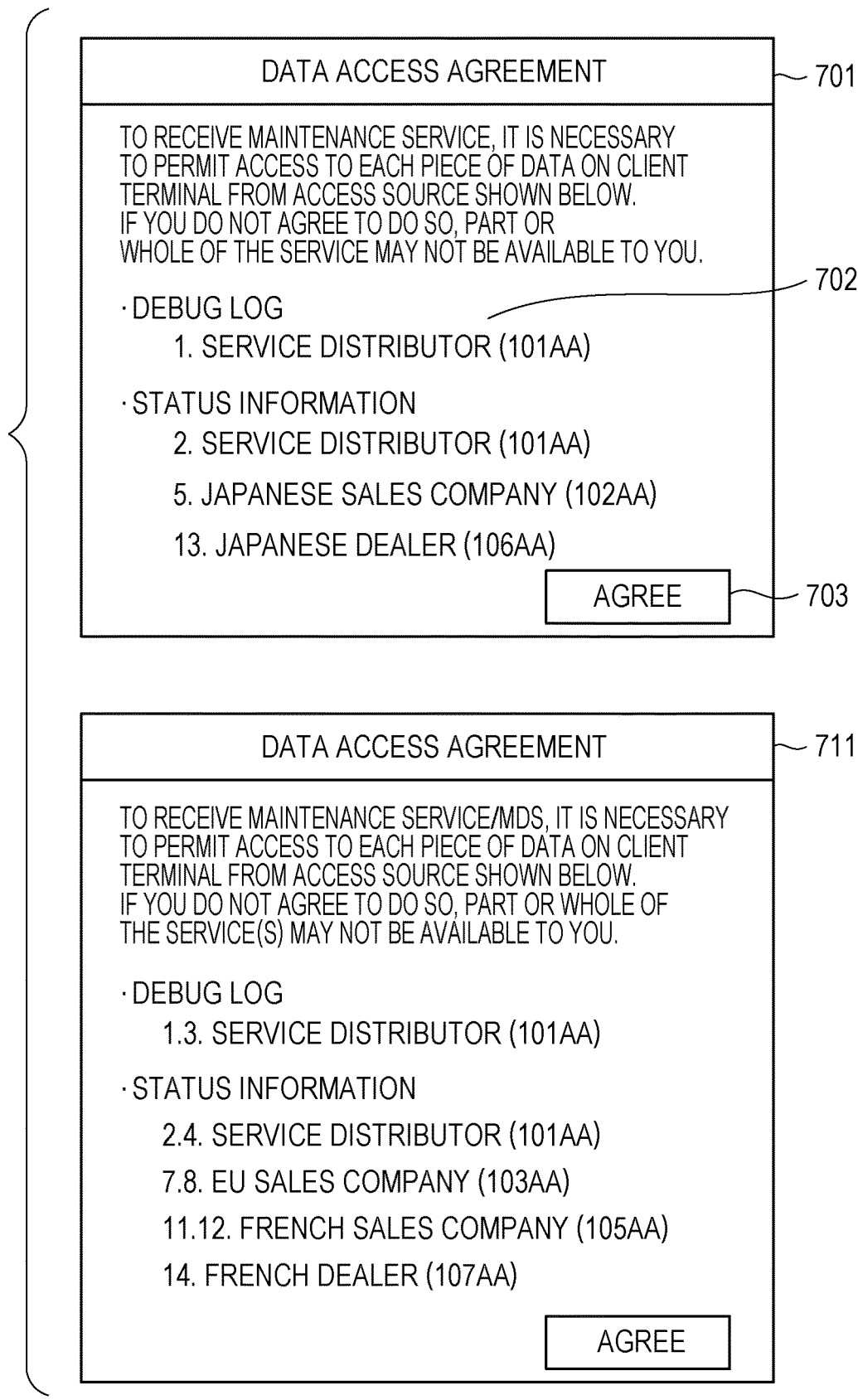
FIG. 7 illustrates an example of a data access agreement screen for agreement to the request access policy.

A display screen for agreement to the request access policy generated in step S604 will be described with reference to FIG. 7. FIG. 7 illustrates a display screen displayed on the web browser 341 when the owner of the device 150 agrees with the request access policy in the client device 140. This display screen is displayed by the access policy management unit 332 when the owner of the device 150 has logged in the information processing system 160 on the web browser 341. On an agreement screen 702 of a data access agreement screen 701, tenants that access the data on the device 150 are listed based on the generated request access policy.

Figure 8:
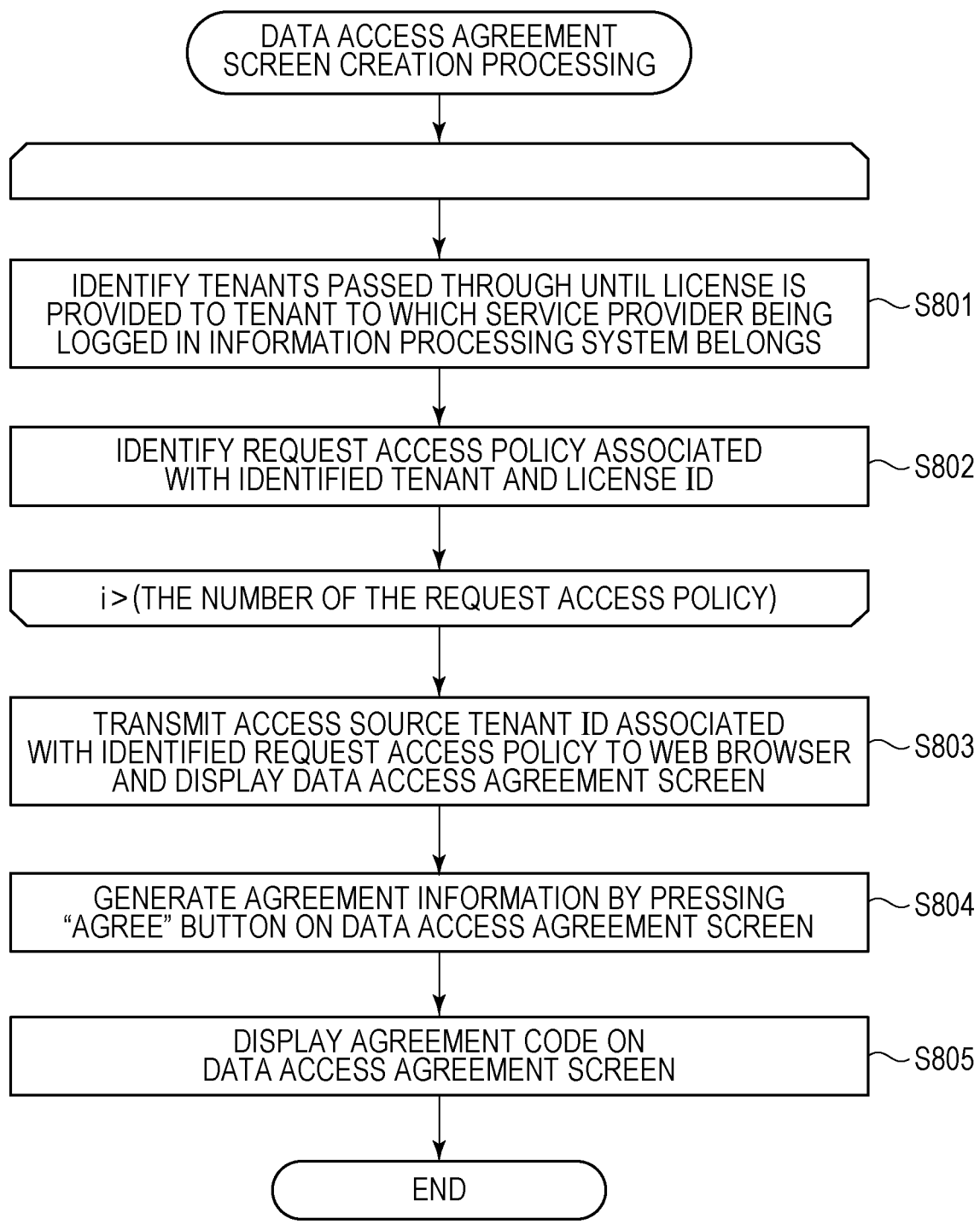
FIG. 8 is a flowchart illustrating processing for listing request access policies to be displayed on an agreement screen 702 and issuing an agreement code.

Referring to FIG. 8, processing for listing the request access policies to be displayed on the agreement screen 702 and generating and/or issuing the agreement code will be described. The flowchart of FIG. 8 is mainly executed by the access policy management unit 332. First, the access policy management unit 332 sequentially performs processing according to a route for which the license is provided based on the service providing route. In the processing, the access policy management unit 332 identifies tenants, which have been passed through until the license is provided to the tenant to which the service user who has logged in the information processing system 160 belongs, by using the information (Table 3) stored in the license management unit 312 (S801). For example, when the tenant to which the user who has logged in the information processing system 160 belongs is the tenant 512 (tenant ID "1002AA"), Table 3 indicates that the license ID of the license that can be used by the tenant 512 is "14". The access policy management unit 332 identifies the request access policy associated with the identified tenant and the license ID (S802). Specifically, Table 3 is referred to for identifying the tenants passed through until the license is provided to the tenant 512 and the license ID, and Table 6 is referred to for acquiring the request access policy ID associated with the license ID.

The access policy management unit 332 repeatedly performs the processing of steps S801 and S802 until the license that can be used by the target tenant and the request access policy associated with the license are acquired. In this example, the processing of steps S801 and S802 is repeatedly performed, and Table 3 shows that the wholesaler tenant IDs of the involved tenants until the license for the maintenance service is provided to the tenant 512 are "101AA", "102AA", and "106AA" and also shows that the license IDs respectively associated with the tenant IDs are "1", "3", and "11". Table 6 shows that the request access policy IDs respectively associated with the license IDs are identified as "1", "2", "5", and "13". In this case, the license category is the maintenance service. This is because Table 3 shows that the license category of the license provided to the tenant 512 is only the "maintenance service". In a case where a plurality of types of licenses is provided to a single tenant, the access policy management unit 332 repeatedly performs steps S801 and S802 until the request access policy associated with each license is identified.

In step S802, after the request access policy is identified, the access policy management unit 332 transmits the access source tenant ID associated with the identified request access policy to the web browser 341, and the web browser 341 displays the data access agreement screen (S803). The access source tenant ID is an ID for identifying the tenant to which the access source tenant rule is applied. The data access agreement screen 701 illustrated in FIG. 7 indicates an example of the data access agreement screen displayed at that time. In this case, the request access policy IDs identified in step S802 are "1", "2", "5", and "13". Accordingly, the access source tenant IDs respectively associated with the request access policy IDs are "101AA" (data category is debug log), "101AA" (data category is status information), "102AA", and "106AA". The identified access source tenant IDs are displayed on the data access agreement screen 701.

Figure 9:
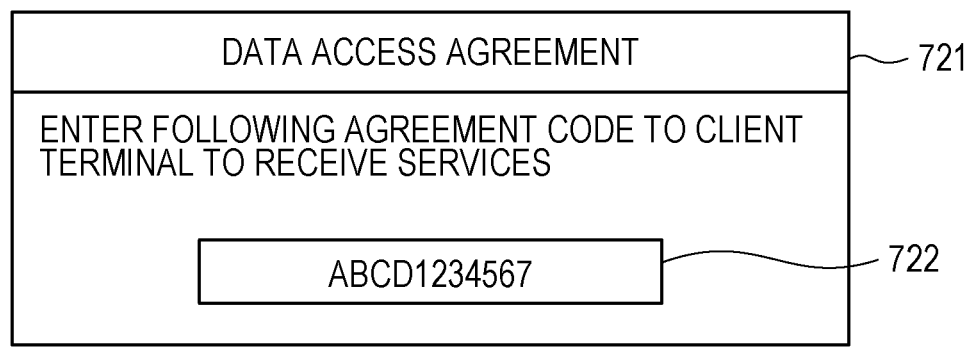
FIG. 9 illustrates an example of an agreement code issuance screen of the client device 140.

When an "agree" button 703 on the data access agreement screen 701 is pressed, the access policy management unit 332 generates agreement information (S804). The term "agreement information" used herein refers to information including the agreement code for uniquely identifying agreement information, information (request access policy acquired in step S802) about the request access policy displayed on the data access agreement screen 701, and information about tenants agreeable with the request access policy. The web browser 341 displays the agreement code (S805). A data access agreement screen 721 illustrated in FIG. 9 is an example of the display screen.

An agreement code 722 is displayed on the data access agreement screen 721. Table 7 shows an example of the agreement information generated by the access policy management unit 332 in S804. The tenant 512 (tenant ID "1002AA") described in this example is a tenant that is agreeable with the content of the request access policy and is finally provided with the license via the tenants associated with the request access policy. Accordingly, Table 7 shows that the tenant ID associated with a request access policy ID list "1, 2, 5, 13" is "1002AA". In the case of the tenant ID "1002AA", Table 7 shows that the agreement code is "ABCD12345" and the agreement code 722 is displayed on the data access agreement screen 721.

TABLE 7

| Agreement Code | Tenant ID | Request Access Policy ID List |
|---|---|---|
| ABCD12345 | 1002AA | 1, 2, 5, 13 |
| ABCD67890 | 1004AA | 1, 2, 3, 4, 7, 8, 11, 12, 14 |

The processing for listing the request access policies to be displayed on the agreement screen 702 and displaying the agreement code on the web browser 341 has been described above. An expiration data may be set to the agreement code generated in step S804.

Next, in order to explain another configuration of the data access agreement screen to be displayed on the web browser 341, a case where the tenant to which the service provider who has logged in the information processing system 160 belongs is the tenant 514 (tenant ID "1004AA") will be described. A data access agreement screen 711 for the tenant 514 is illustrated in FIG. 7. The processing for listing the request access policies is similar to that for the tenant ID "1002AA", and thus the description thereof is omitted. In the case of the tenant ID "1004AA", as a result of the processing illustrated in FIG. 8, the tenants passed through until the license is provided and the request access policy IDs respectively associated with the tenants are identified as "1, 2, 3, 4, 7, 8, 11, 12, and 14". As described above, in a case where a plurality of types of licenses (maintenance service, MDS service) is provided to a single tenant (tenant 514 in this case), the processing of steps S801 and S802 is repeatedly performed until the request access policy associated with each license is identified. As a result, the request access policy IDs identified in this case are "1, 2, 3, 4, 7, 8, 11, 12, and 14".

The request access source tenant IDs and the data categories may overlap even when different request access policy IDs are used. For example, in the case of request access policy IDs "1" and "3", the access source tenant ID is "101AA" and the data category is "debug log". In this case, different request access policy IDs may be listed and displayed one by one like in the data access agreement screen 701. Another display mode capable of displaying merged pieces of overlapping information and collectively setting the information may be adopted like in the data access agreement screen 711. Another configuration of the data access agreement screen to be displayed on the web browser 341 has been described above.

Figure 10:
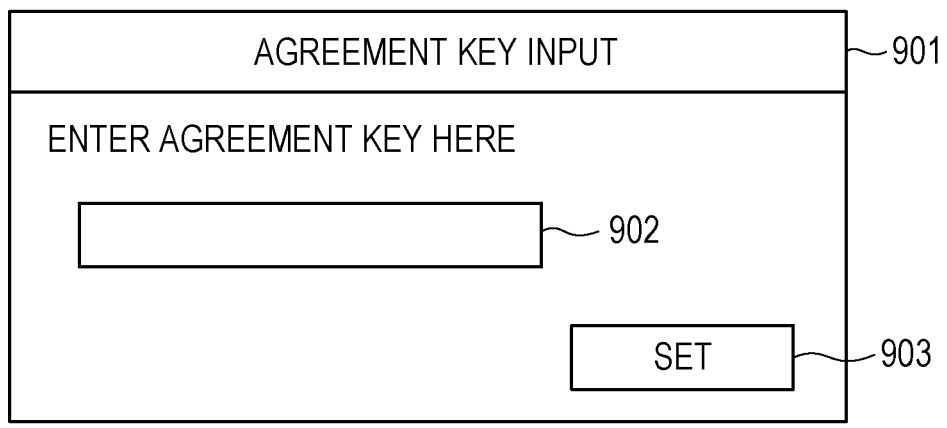
FIG. 10 illustrates an example of an agreement code inputting screen of the device 150.
Figure 11:
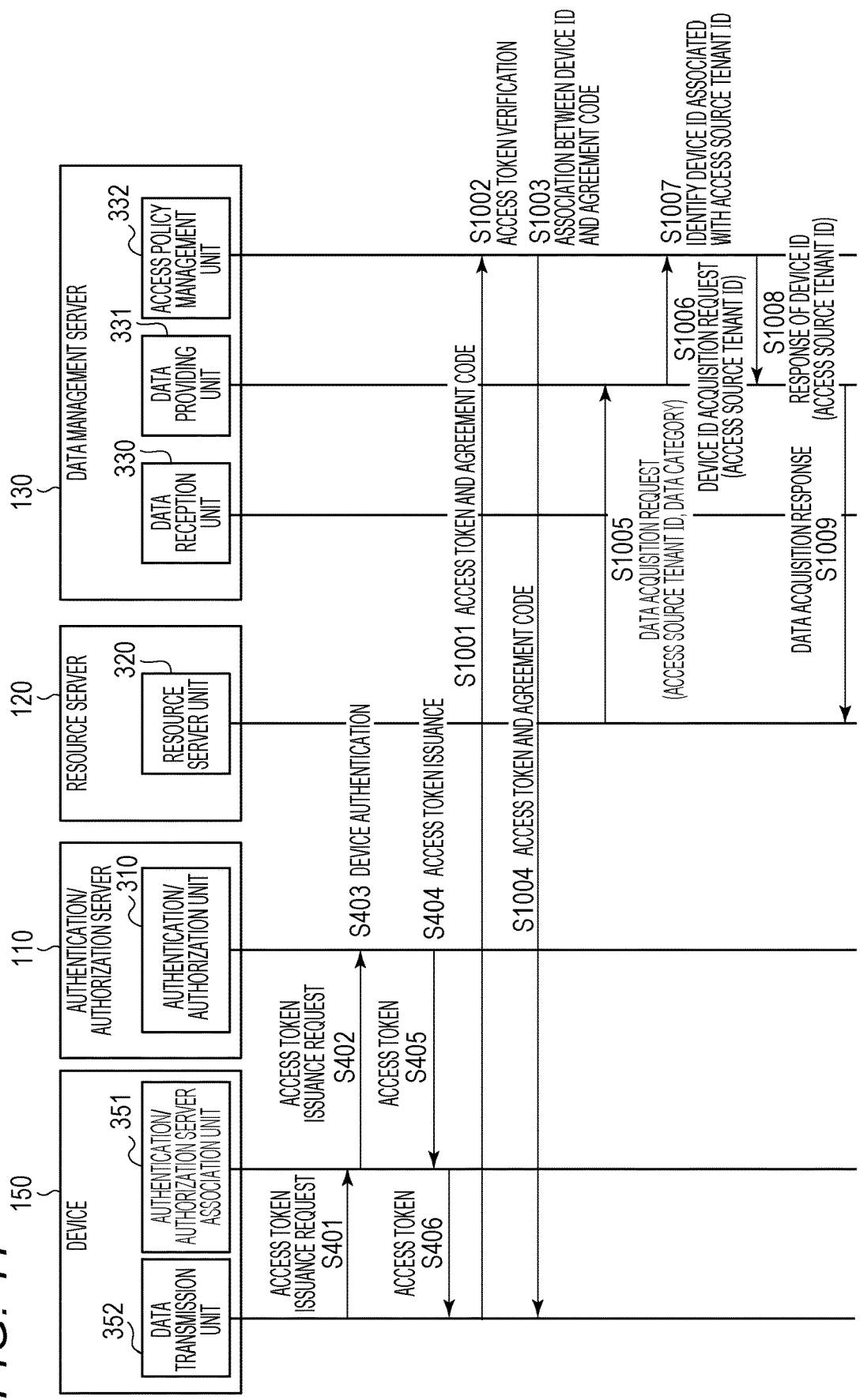
FIG. 11 is a sequence diagram illustrating processing in which a user acquires data on the device 150.

Next, processing for associating the request access policy agreed in step S803 with the data on the device 150 will be described. FIG. 10 is an agreement code input screen to be display on a web browser, which is not illustrated, of the device 150. The user inputs the agreement code (FIG. 9) to be displayed on the client device 140 in step S805 to the agreement code input screen 901, thereby starting the processing illustrated in FIG. 11. FIG. 11 is a sequence diagram illustrating processing in which the user acquires the data on the device 150. Processing similar to that in FIG. 4 is denoted by the same reference numeral and the description thereof is omitted.

In step S406, the data transmission unit 352 acquires the access token from the authentication/authorization server association unit 351, and then the data transmission unit 352 transmits the agreement code obtained in step S805 together with the access token to the access policy management unit 332 (S1001). It is assumed herein that the agreement code transmitted in step S1001 is the agreement code input by the user on the web browser, which is not illustrated, of the device 150, and the input agreement code is managed by the data transmission unit 352.

The access policy management unit 332 verifies the access token received in step S1001 (S1002). The access policy management unit 332 holds a public key for verifying the received access token. The access policy management unit 332 uses the public key to verify the access token, thereby enabling acquisition of the device ID and the agreement code. As the method for verifying the access token, another method in which the access policy management unit 332 requests the authentication/authorization unit 310 to verify the access token and acquires the verification result and the device ID from the authentication/authorization unit 310 may be employed.

In step S1002, the access policy management unit 332 verifies the access token, and then manages the agreement code and the device ID included in the access token in such a manner that the agreement code and the device ID are associated with each other (S1003). Table 8 shows an example of information associating the device ID and the agreement code that are managed by the access policy management unit 332. Thus, the use of the agreement code enables the request access policy to be associated with the data on the device 150 which has received the agreement code.

TABLE 8

| Device ID | Agreement Code |
| --- | --- |
| dev_00001 | ABCD12345 |
| dev_00002 | ABCD12345 |

Table 8 shows a configuration in which the same agreement code "ABCD12345" is associated with two devices 150 having different device IDs of "dev_00001" and "dev_00002", respectively. The user can input the same agreement code to a plurality of different devices 150. In this case, as shown in Table 8, the same agreement code is associated with different device IDs and managed. Further, a plurality of agreement codes can be input to a single device 150. In this case, a plurality of different agreement codes is associated with a single device ID and managed.

The access policy management unit 332 associates the device ID with the agreement code, and then the access policy management unit 332 returns the result of the request in step S1001 to the data transmission unit 352 (S1004). The processing for associating the device ID with the agreement code has been described above. The device ID is information for identifying the data on the device 150, and the agreement code is information for identifying the agreed request access policy. Accordingly, when the device ID is associated with the agreement code, the request access policy is associated with the data on the device 150.

Next, the processing, in which the resource server 120 accesses the data on the device 150 managed by the data management server 130 to acquire data, will be described below with reference to FIG. 11 (step S1005 and subsequent steps). The processing (step S1005 and subsequent steps) is started when the resource server unit 320 transmits a data acquisition request to the data providing unit 331. Further, the processing in which the resource server unit 320 transmits the data acquisition request to the data providing unit is started when the user transmits the data acquisition request to the resource server unit 320 from the web browser 341, which is not illustrated, in FIG. 11. In addition to the start mode, a mode in which the resource server unit 320 periodically transmits the data acquisition request to the data providing unit 331 and the resource server unit 320 performs batch processing using the data obtained as a result.

The resource server 120 transmits, to the data providing unit 331, the access source tenant ID and the data category as the data acquisition request (S1005). Specifically, it is assumed that the access source tenant ID "106AA" and the data category "status information" are transmitted to the data providing unit 331. The data providing unit 331 transmits the device ID acquisition request together with the access source tenant ID to the access policy management unit 332 (S1006).

The access policy management unit 332 identifies the device ID associated with the received access source tenant ID (S1007). Specifically, the request access policy ID that matches the access source tenant ID received in step S1006 is identified by the request access policy (Table 6) managed by the access policy management unit 332. The agreement code associated with the identified request access policy ID is identified using the agreement information (Table 7) managed by the access policy management unit 332. The identified agreement code and the device ID associated with the agreement code are identified. In this case, Table 6 shows that the request access policy ID associated with the access source tenant ID "106AA" is "13". Table 7 shows that the agreement code associated with the request access policy ID "13" is "ABCD12345". Table 8 shows that the device ID associated with the agreement code "ABCD12345" is "dev_00001".

The device ID identified in step S1007 is transmitted to the data providing unit 331 (S1008). If there is a plurality of device IDs identified in step S1007, a list of the plurality of identified device IDs is transmitted to the data providing unit 331. In this case, the device ID "dev_00001" identified in step S1006 is transmitted to the data providing unit 331. Data associated with the device ID acquired in step S1006 and the data category received in step S1005 from the data divided for each device ID and each data category in step S409 is returned to the resource server unit 320 (S1009). In this case, data associated with the device ID "dev_00001" and the data category "status information" is identified and transmitted to the resource server unit 320. Thus, the resource server unit 320 can acquire the data on the device 150 within a permitted range of request access policies.

In step S1007, if the device ID associated with the access source tenant ID cannot be identified, an error notification is transmitted to the resource server unit 320 via the data providing unit 331.

According to the first exemplary embodiment, the owner of the device collectively permits the request access policies, thereby making it possible to reduce the time and labor for associating a plurality of request access policies with the service providing route and provide device data to each tenant according to the agreed request access policies.

Second Exemplary Embodiment

In the first exemplary embodiment, a configuration in which the request access policies displayed on the client device 140 are collectively permitted by the owner of the device has been shown. A second exemplary embodiment describes a case where the service provider belonging to a tenant in the middle of the service providing route denies the agreement with the content of the request access policies with reference to FIGS. 11 and 12. Parts that are not described in the second exemplary embodiment are the same as those described in the first exemplary embodiment.

Figure 12:
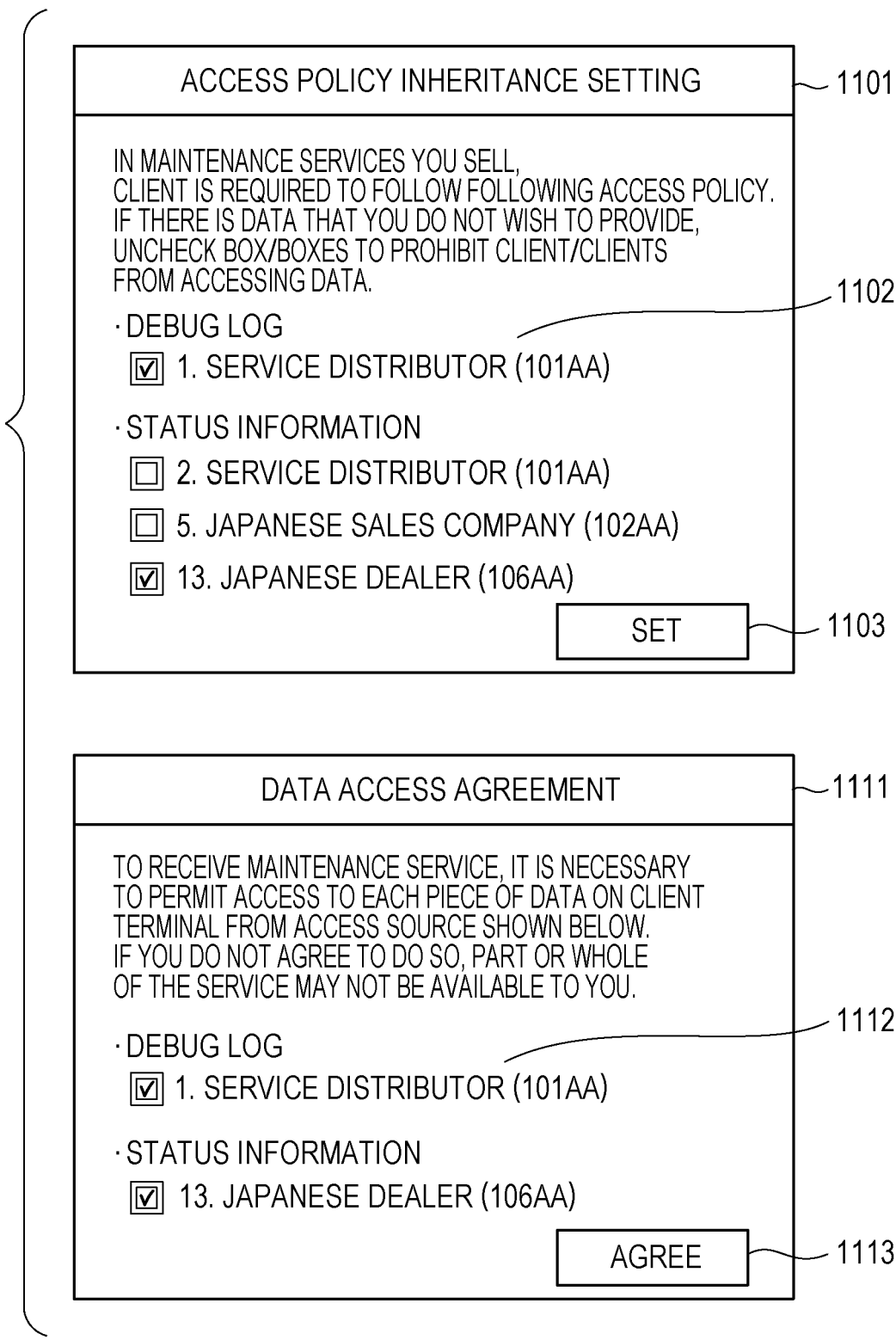
FIG. 12 illustrates an example of the data access agreement screen for agreement to the request access policy according to a second exemplary embodiment.

An access policy inheritance setting screen 1101 illustrated in FIG. 12 is a display screen to be displayed on the web browser 341 based on information about the request access policies managed by the access policy management unit 332, like in the case of FIG. 7. FIG. 12 illustrates an example of a display screen to be displayed when the service provider belonging to a Japanese dealer tenant with a tenant ID "106AA" has logged in the information processing system 160. Processing similar to that illustrated in FIG. 8 is performed, and the request access policies agreeable to the tenant ID "106AA" are listed on the access policy inheritance setting screen 1101. The request access policy IDs in the listed request access policies are "1", "2", "5", and "13", and are displayed on an agreement screen 1102. A checkbox is provided on a side of each request access policy ID. If there is a request access policy, the content of which is not agreeable, the checkbox provided on a side of the request access policy ID is unchecked and a "set" button (1103) is pressed. As a result, information about the request access policy, the content of which is not agreeable, is generated by the access policy management unit 332. Table 9 shows an example of the generated information. The term "denied access policy ID list" of Table 9 refers to a list of request access policy IDs, the content of which is not agreeable, on the web browser 341. In this case, on the agreement screen 1102, the user with the tenant ID "106AA" unchecks the checkboxes provided on the side of each of the request access policy IDs "2" and "5". Accordingly, in the access policy management unit 332 (Table 9), "2, 5" is set as the "denied access policy ID list" with the tenant ID "106AA".

TABLE 9

| Tenant ID | Denied Access Policy ID List |
| --- | --- |
| 106AA | 2, 5 |

Figure 13:
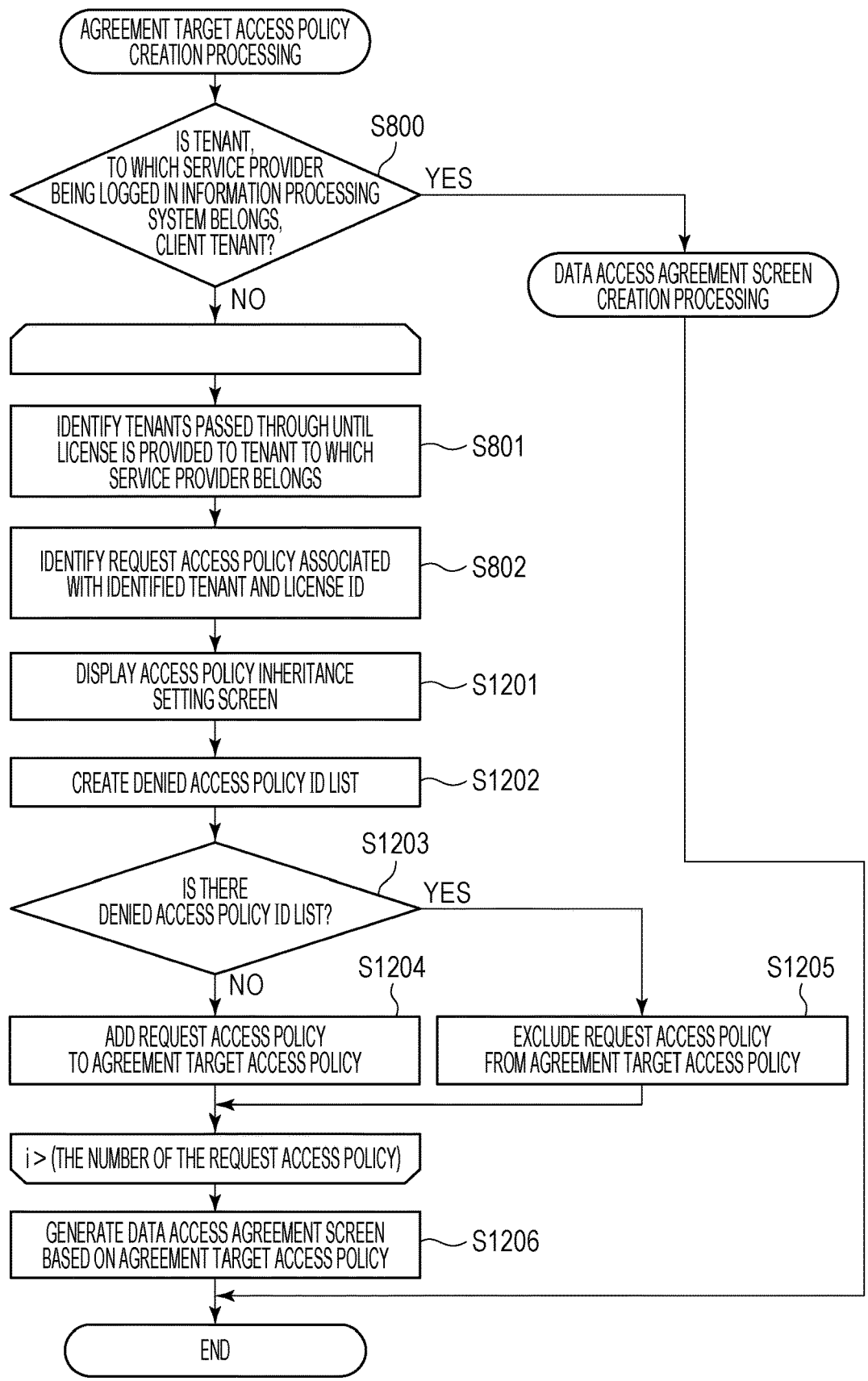
FIG. 13 is a flowchart for listing request access policies to be displayed on an agreement screen 1102 according to the second exemplary embodiment.

A processing flow in which the access policy management unit 332 generates the data access agreement screen based on Table 9 will be described with reference to FIG. 13. Processing similar to that in FIG. 8 is denoted by the same reference numeral and the description thereof is omitted. It is determined whether the tenant to which the service provider who has logged in the information processing system 160 belongs is a client tenant (S800). If it is determined that the tenant is a client tenant, processing for creating the data access agreement screen illustrated in FIG. 8 is executed. If it is determined that the tenant is not a client tenant, the processing proceeds to step S801. Specifically, if the tenant to which the user who has logged in the information processing system 160 belongs is the tenant 512 (tenant ID "1002AA"), it is determined that the tenant is a client tenant based on the information (Table 2) managed by the tenant management unit 311, and the processing illustrated in FIG. 8 is executed. On the other hand, if the tenant to which the user who has logged in the information processing system 160 belongs is the tenant 505 (tenant ID "105AA"), it is determined that the tenant is a sales tenant, and the processing proceeds to step S801. In the processing in step S800, it is determined whether a checkbox for selecting an agreeable request access policy is provided at a side of each request access policy ID on the agreement screen. In the present exemplary embodiment, the presence or absence of the checkbox at a side of each request access policy ID is used as a condition for determination in step S800. However, the condition for determination is not limited to this. The timing of determining whether or not to display the checkbox is not limited to the timing in step S800, but the determination may be made at any timing as long as the determination is made before the timing (S805, S1206) when the data access agreement screen is generated.

In step S802, the access policy management unit 332 identifies the request access policies listed on the web browser 341, and then the access policy inheritance setting screen 1101 is displayed (S1201). The user selects an agreeable request access policy on the access policy inheritance setting screen 1101, and presses the "set" button 1103. As a result, the access policy management unit 332 creates a rejected access policy ID list (S1202). In the rejected access policy ID list (Table 9) created in step S1202, the presence or absence of the rejected access policy ID list is determined (S1203). Specifically, the request access policies identified in step S802 are compared with the rejected access policy ID list in Table 9 to check whether Table 9 includes a value. If the value is not included, the request access policies identified in step S802 are added to agreement target access policies (S1204). If the value is included, the request access policy included in the denied access policy ID list is excluded from the agreement target (S1205). In this case, the request access policies with the request access policy ID "2, 5" are denied, and thus only the request access policy ID "1, 13" is added to the agreement target access policies. The access policy management unit 332 generates the data access agreement screen based on the agreement target access policies generated in step S1204 (S1206). FIG. 12 (display screen 1111) illustrates an example of the generated data access agreement screen. On the display screen 1111, only the information about the request access policies that are not agreed is not displayed on the access policy inheritance setting screen 1101.

The processing in which a tenant in the middle of the service providing route denies the agreement with the request access policies has been described above. According to the present exemplary embodiment, it is possible to set, for each request access policy, details of the agreement with the request access policy for a higher wholesaler tenant by a tenant in the middle of the service providing route. For example, if a dealer in the middle of the sales route does not want the service provider of a wholesaler tenant to know client information of the dealer, the dealer may disagree with the request access policy for the wholesaler tenant to access the client information.

The second exemplary embodiment illustrates a configuration in which a tenant in the middle of the service providing route selects an agreeable request access policy. However, like in the first exemplary embodiment, a configuration in which a client tenant at an end of the service providing route selects an agreeable request access policy on the access policy inheritance setting screen 1101 may be adopted.

An information processing system according to one or more aspects of the present disclosure provides improvements to information processing technology, among other aspects, in reducing a work for associating a plurality of access policies for a service providing route by collectively agreeing with access policies associated with a plurality of tenants involved in the service providing route, and controlling a provision of data on a device in accordance with the agreed access policies.

An information processing system according to one or more aspects of the present disclosure provides improvements to information processing technology to reduce an effort for associating a plurality of access policies for a service providing route by collectively agreeing with access policies associated with a plurality of tenants involved in the service providing route, and to control a provision of data on a device in accordance with the agreed access policies.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-118611, filed Jun. 16, 2017, which is hereby incorporated by reference herein in its entirety.

What is claimed is:

1. An information processing system comprising:
one or more processors configured to:
store data on a device;
generate a request access policy associating tenant information for identifying a tenant, with attribute information about data and license information for identifying a license of the service, wherein the data is accessible by the tenant when a user belonging to the tenant provides a service;
identify a user tenant to which a user who has logged in the information processing system belongs and identify a plurality of tenants including the identified user tenant which are passed through when a license of the service is provided to the user tenant;
provide an agreement screen for an agreement that a target tenant accesses data having a specific attribute, based on one or more request access policies associated with the license information and the tenant information of the plurality of identified tenants;
issue an agreement code upon agreement of the user with a content of the provided agreement screen; and
following input of the issued agreement code to the device, control provision of data on the device having received the agreement code based on the one or more request access policies associated with the input agreement code.

2. The information processing system according to claim 1, wherein
the agreement code is associated with a device identifier for identifying the device having received the agreement code, and
based on the device identifier associated with the agreement code, the one or more processors are further configured to identify device data to be transmitted to a transmission source of a data acquisition request for acquiring the data.

3. The information processing system according to claim 2, wherein the data on the device is transmitted to the information processing system after the device is authenticated in the information processing system, and the data is managed in association with the device identifier and the attribute information about the data.

4. The information processing system according to claim 2, wherein
the data acquisition request for acquiring the data includes transmission source tenant information for identifying a tenant to which a transmission source of the data acquisition request belongs, and
the one or more processors are further configured to control provision of data on the device by identifying a request access policy associated with the transmission source tenant information and identifying the agreement code associated with the identified request access policy.

5. The information processing system according to claim 1, wherein
a data acquisition request for acquiring the data includes attribute information about the data, and
the one or more processors are further configured to identify device data to be transmitted to the transmission source based on the attribute information about the data included in the data acquisition request.

6. The information processing system according to claim 1, wherein
the information processing system enables the user to select a content of the agreement screen, and
the one or more processors are further configured to issue the agreement code to a request access policy associated with the content of the agreement screen selected by the user.

7. The information processing system according to claim 6, wherein
a tenant to which a first user belongs is a sales tenant, wherein the first user provides a device service to a second user of a client tenant by using the data,
wherein the content of the agreement screen is selectable by the first user, and
wherein the content of the agreement screen is not selectable by the second user.

8. The information processing system according to claim 1, wherein the one or more processors are further configured to generate the request access policy corresponding to the target tenant in a case where it is determined that the target tenant satisfies a master policy based on the master policy associating the attribute information about the data with category information about the tenant accessible to data including a specific attribute.

9. The information processing system according to claim 1, wherein the attribute information about the data is information indicating one of a debug log, status information, and a job log.

10. The information processing system according to claim 1, further comprising:
an authentication/authorization server;
a resource server; and
a data management server.

11. The information processing system according to claim 10, further comprising:
a client device.

12. The information processing system according to claim 1, wherein the information processing system provides improvements to information processing technology in reducing a work for associating a plurality of access policies for a service providing route by collectively agreeing with access policies associated with a plurality of tenants involved in the service providing route, and controlling a provision of data on a device in accordance with the agreed access policies.

13. The information processing system according to claim 1, wherein the information processing system provides improvements to information processing technology to reduce an effort for associating a plurality of access policies for a service providing route by collectively agreeing with access policies associated with a plurality of tenants involved in the service providing route, and to control a provision of data on a device in accordance with the agreed access policies.

14. A control method for an information processing system, the method comprising:
storing data on a device;
generating a request access policy associating with tenant information for identifying a tenant, with attribute information about data and license information for identifying a license of the service, wherein the data is accessible by the tenant when a user belonging to the tenant provides a service;
identifying a user tenant to which a user who has logged in the information processing system belongs and identifying a plurality of tenants including the identified user tenant which are passed through when a license of the service is provided to the user tenant;
providing an agreement screen for an agreement that a target tenant accesses data having a specific attribute based on one or more request access policies associated with the license information and the tenant information of the plurality of identified tenants;
issuing an agreement code upon agreement of the user with a content of the provided agreement screen; and
following input of the issued agreement code, controlling provision of data on the device having received the agreement code based on the one or more request access policies associated with the input agreement code.

15. A non-transitory storage medium storing instructions that when executed by one or more processors controls the one or more processors to execute a method comprising:
storing data on a device;
generating a request access policy associating tenant information for identifying a tenant, with attribute information about data and license information for identifying a license of the service, wherein the data is accessible by the tenant when a user belonging to the tenant provides a service;
identifying a user tenant to which a user who has logged in an information processing system belongs and identifying a plurality of tenants including the identified user tenant which are passed through when a license of the service is provided to the user tenant;
providing an agreement screen for an agreement that a target tenant accesses data having a specific attribute based on one or more request access policies associated with the license information and the tenant information of the identified plurality of identified tenants;
issuing an agreement code upon agreement of the user with a content of the provided agreement screen; and
following input of the issued agreement code to the device, controlling provision of data on the device having received the agreement code based on the one or more request access policies associated with the input agreement code.

* * * * *